(12) United States Patent
Kawaoka et al.

(10) Patent No.: US 7,158,172 B2
(45) Date of Patent: Jan. 2, 2007

(54) DIGITAL CAMERA WITH AN AUTOMATIC IMAGE TRANSMISSION FUNCTION

(75) Inventors: Yoshiki Kawaoka, Saitama (JP);
Yoshiko Shiimori, Saitama (JP);
Atsushi Nakamura, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 765 days.

(21) Appl. No.: 09/884,051

(22) Filed: Jun. 20, 2001

(65) Prior Publication Data
US 2002/0051074 A1  May 2, 2002

(30) Foreign Application Priority Data
Jun. 20, 2000  (JP) ............................... 2000-184745
Jun. 20, 2000  (JP) ............................... 2000-184753

(51) Int. Cl.
*H04N 5/232* (2006.01)
*H04N 5/225* (2006.01)
*G06F 15/16* (2006.01)

(52) U.S. Cl. ............................ 348/211.1; 348/207.1; 709/217

(58) Field of Classification Search ............ 348/207.1, 348/207.11, 211.99, 211.1, 211.3, 211.4, 348/211.5, 211.6, 231.2, 231.6, 222.1, 552, 348/371; 709/217
See application file for complete search history.

(56) References Cited

U.S. PATENT DOCUMENTS 5,917,542 A * 6/1999 Moghadam et al. ... 348/231.99
6,204,877 B1 * 3/2001 Kiyokawa ................ 348/211.3
6,230,187 B1 * 5/2001 Suzuki ....................... 709/206
6,253,023 B1 * 6/2001 Fukushima et al. ......... 348/372
6,642,959 B1 * 11/2003 Arai ......................... 348/211.3
6,715,003 B1 * 3/2004 Safai ........................ 348/211.3
6,774,935 B1 * 8/2004 Morimoto et al. ....... 348/211.5
6,812,962 B1 * 11/2004 Fredlund et al. ......... 348/207.1
6,832,275 B1 * 12/2004 Aizawa ................... 348/207.1
2002/0057350 A1 * 5/2002 Takei et al. ................ 348/231
2004/0169730 A1 * 9/2004 Tamura et al. ........... 348/207.2

FOREIGN PATENT DOCUMENTS

JP   56152368 A   * 11/1981
JP   09288684 A   * 11/1997
JP   10336574      12/1998
JP   2000134531 A  * 5/2000
JP   2001086277 A  * 3/2001
JP   2001148802 A  * 5/2001

OTHER PUBLICATIONS

Translation of Japanese Publ. No. 2000-134531 A. Provided by McElroy Translation Company.*

* cited by examiner

*Primary Examiner*—David Ometz
*Assistant Examiner*—John M. Villecco
(74) *Attorney, Agent, or Firm*—Birch, Stewart, Kolasch & Birch, LLP

(57) ABSTRACT

A digital camera with an automatic image transmission function which includes a transmission section for transmitting photo images and a transmission control unit connected to the transmission section. The transmission control unit judges whether a predetermined transmission allowance condition is satisfied and allows the transmission of photo images only when the predetermined transmission allowance condition is satisfied. As one example, the predetermined transmission allowance condition includes a condition when photography is completed.

35 Claims, 13 Drawing Sheets

DIGITAL CAMERA WITH AN AUTOMATIC IMAGE TRANSMISSION FUNCTION

This patent application claims priority from a Japanese patent applications No. 2000-184745 filed on Jun. 20, 2000 and No. 2000-184753 filed on Jun. 20, 2000 contents of which are incorporated herein by reference.

BACKGROUND OF THE INVENTION

1. Field of the Invention

The present invention relates to a digital camera. More particularly, the present invention relates to a digital camera capable of automatically transmitting photo images based on a predetermined condition which makes transmission of data from the camera more reliable and efficient.

2. Description of the Related Art

Conventionally, in order to use a personal computer to print out or edit photos taken by a digital camera, a user connects the digital camera and the personal computer through a predetermined interface. Then, the user transfers each photo to the personal computer. Alternatively, rather than the troublesome task of data transfer using a wire connection between a digital camera and a personal computer, data transfer to a predetermined place using a cellular phone has been invented in recent years. Japanese Patent Application Laying Open No. H10-336574 discloses an invention for transmitting image data to a high-capacity database server by using a data modem and a cellular phone, for example, when free memory areas of a digital camera become less than a set amount.

However, in the prior art invention described above, other conditions that are better adapted for a data transfer are not considered, except for a condition of the free memory areas. Thus, even if the timing is bad for the digital camera to transfer image data, the processing of the image data transfer is undertaken. As an example, in a case where the user tries to take a series of photographs, the processing of the image transfer begins while photographing when the free memory areas decrease to the set amount by the serial photography. Generally, since photographing and transferring data cannot be undertaken simultaneously, the photographing is interrupted by the data transfer. Therefore, it is necessary to consider more appropriate conditions for data transfer of photo images from a digital camera. For example, there exists a need to transmit data faster and more reliably with a cheaper communication cost.

SUMMARY OF THE INVENTION

Therefore, it is an object of the present invention to provide a digital camera with an automatic image transmission function, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a digital camera with an automatic image transmission function includes: a transmission section for transmitting photo images; and a transmission control unit connected to the transmission section, the transmission control unit judges whether a predetermined transmission allowance condition is satisfied and allows the transmission of photo images when the predetermined transmission allowance condition is satisfied. The predetermined transmission allowance condition includes a condition when photography is completed.

The digital camera may further include a battery, and the transmission control unit may include a battery status-obtaining section connected to the battery. The battery status-obtaining section may obtain a storage level of the battery; and the predetermined transmission allowance condition may include a condition when the battery has a predetermined storage level.

The digital camera may further include an LCD monitor, and the transmission control unit may include an image quality selection-obtaining section connected to the LCD monitor. The image quality selection-obtaining section may notify a user that the photo images are transmittable by changing an image quality, based on the information of remaining storage level of the battery obtained by the battery status-obtaining section, and may obtain a selection of the image quality from the user. The predetermined transmission allowance condition may include a condition when a data amount required for the selected image quality is within a predetermined range.

The digital camera may further include a timer, and the transmission control unit may include a time-obtaining section connected to the timer. The time-obtaining section may obtain time; and the predetermined transmission allowance condition may include a condition when the time is in a predetermined time range appropriate for transmitting the photo images.

The transmission control unit may notify a user of a period of time to an end of the predetermined time range, based on the time obtained by the time-obtaining section.

The digital camera may further include a memory that stores the photo images, and the transmission control unit may include a data amount-obtaining section connected to the memory. The data amount-obtaining section may obtain a data amount of the photo images to be transmitted; and the predetermined transmission allowance condition may include a condition when a cost for transmitting the photo images calculated by the data amount is within a predetermined range.

The data amount-obtaining section may accept a selection of the data amount by a user.

The digital camera may further include: a volatile memory connected to the data amount-obtaining section, which provides the stored photo images to the transmission control unit and erases the stored photo images after providing the photo images; and a non-volatile memory connected to the data amount-obtaining section, which stores the photo images after the transmission section transmits the photo images.

The predetermined transmission allowance condition may include a condition when a remaining time for transmitting the photo images is shorter than a predetermined time, in a case where a cost for a transmission is calculated based on unit communication time.

The digital camera may further include a release switch; and the transmission control unit may include a transmission control-obtaining section connected to the release switch, which obtains an instruction to control transmission of each of the photo images after photography.

The transmission control unit may include a transmission addressee registration section for registering a phone number of an addressee for transmitting the photo images.

The predetermined transmission allowance condition may include a condition when a number of the photo images to be transmitted reaches a predetermined number; and the digital camera may automatically transmit a plurality of the photo images at one time.

The predetermined transmission allowance condition may include a condition when a predetermined period of time has passed after photography is finished.

The predetermined transmission allowance condition may include a condition when a power of the digital camera is to be turned off and there are the photo images to be transmitted; and the power may be turned off after a plurality of the photo images to be transmitted are automatically transmitted at one time.

The predetermined transmission allowance condition may include a condition when a power of the digital camera is turned on and there are the photo images to be transmitted, a plurality of the photo images may be automatically transmitted at one time.

The digital camera may further include a memory for temporarily and sequentially storing the photo images, and the predetermined transmission allowance condition may include a condition when at least one of a data capacity and a number of the photo images stored in the memory becomes more than a predetermined amount. The digital camera may automatically transmit the photo images in an order that the photo images are stored.

The digital camera may automatically transmit the photo images when a wireless communication means is communicable.

The digital camera may suspend transmitting the photo images if a photography operation is started while transmitting the photo images, and may restart transmitting the suspended photo images after the photography operation is finished.

The digital camera may have a plurality of the transmission allowance conditions, and the transmission allowance conditions may be selectable.

According to the second aspect of the present invention, a method for controlling a transmission includes: judging whether or not a predetermined transmission allowance condition is satisfied; transmitting photo images when it is judged that the predetermined transmission allowance condition is satisfied; and judging whether or not photography is completed.

The method may further include obtaining a storage level of a battery; and judging whether or not the battery has a predetermined storage level.

The method may further include notifying a user that the photo images are transmittable by changing an image quality, based on obtained information of remaining storage level of the battery; obtaining a selection of the image quality from the user; and judging whether or not a data amount required for the selected image quality is within a predetermined range.

The method may further include obtaining time; and judging whether or not the time is in a predetermined time range appropriate for transmitting the photo images.

The judging may notify a user of a period of time to an end of the predetermined time range, based on the obtained time.

The method may include obtaining a data amount of the photo images to be transmitted; and judging whether or not a cost for transmitting the photo images calculated by the data amount is within a predetermined range.

The method may further include: selecting a data amount by a user, and transmitting the photo images corresponding to the data amount selected by the user.

The method may further include judging whether or not a remaining time of a transmission time for transmitting the photo images is shorter than a predetermined time, in a case where a cost for the transmission time is calculated based on unit communication time.

The method may further include obtaining an instruction to control transmitting for each of the photographed images, after photography.

The method may further include registering a phone number of an addressee for transmitting the photo images.

The method may further include judging whether or not a number of the photo images to be transmitted has reached a predetermined number; and transmitting a plurality of the photo images at one time when the number reaches the predetermined number.

The method may further include judging whether or not a predetermined period of time has passed after photography is finished.

The method may further include judging whether or not a power of the digital camera is to be turned off; and judging whether or not there are the photo images to be transmitted. The power may be turned off after a plurality of the photo images to be transmitted are automatically transmitted at one time.

The method may further include judging whether or not a power of the digital camera is turned on; and judging whether or not there are the photo images to be transmitted. A plurality of the photo images may be automatically transmitted at one time.

The method may further include temporarily and sequentially storing the photo images in a memory, judging whether or not at least one of a data capacity and a number of the photo images stored in the memory has become more than a predetermined amount; and automatically transmitting the stored photo images in an order of storage.

The method may further include erasing the photo images from a main memory after transmitting.

The method may further include obtaining information whether or not a wireless communication means is communicable; and automatically transmitting the photo images when a wireless communication means is communicable.

The method may further include suspending transmitting of the photo images if a photography operation is started while transmitting the photo images and restarting transmitting the suspended photo images after the photography operation is finished.

The judging may be based on a plurality of conditions.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
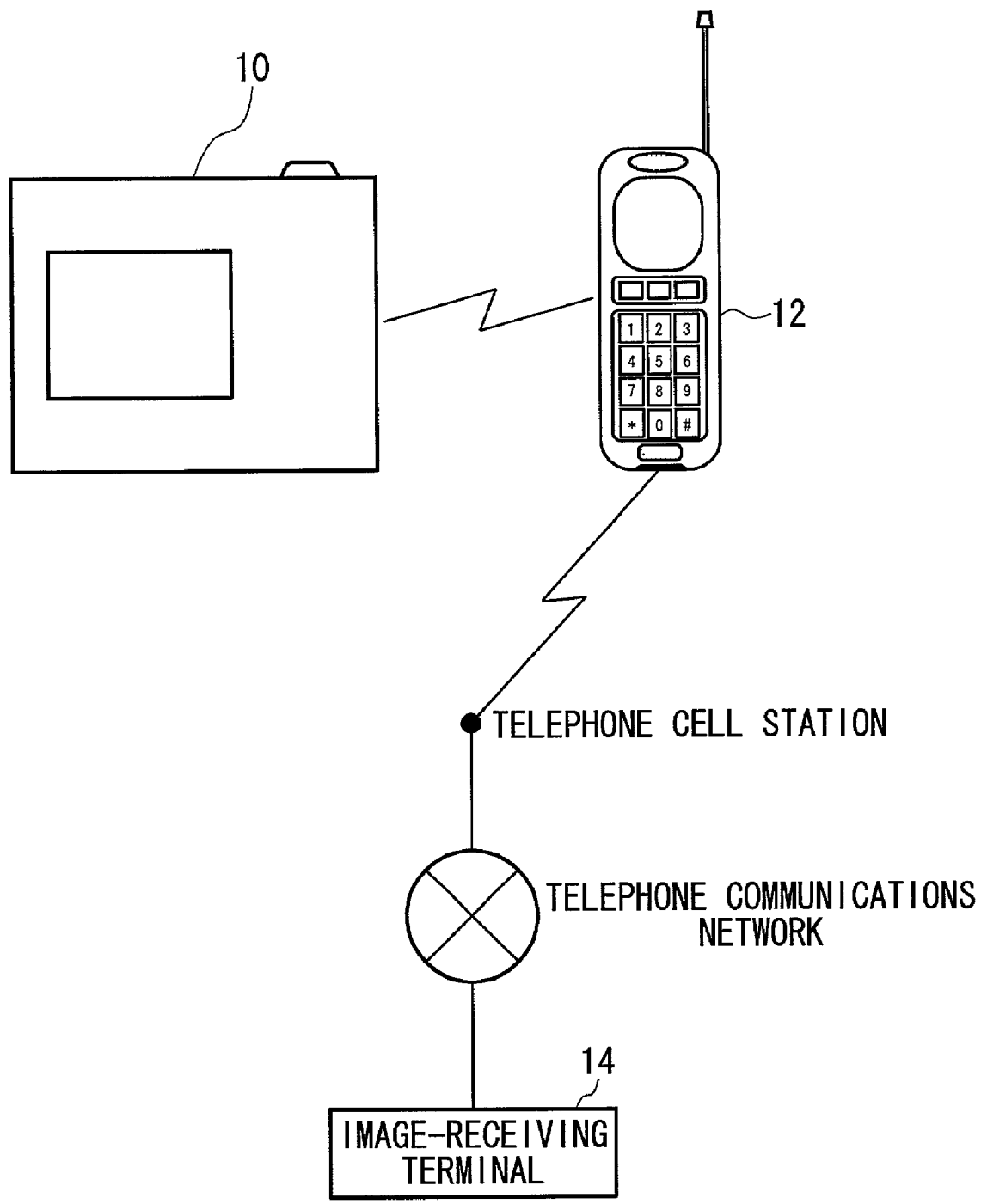
FIG. 1 is a schematic diagram of the structure of a system used for an embodiment of a digital camera with an automatic image transmission function of the present invention.

FIG. 1 is a diagram showing the structure of a system used for an embodiment of a digital camera with an automatic image transmission function 10 of the present invention. The digital camera with an automatic image transmission function 10 is capable of communicating data with an image-receiving terminal 14 by means of wireless communications. The image-receiving terminal 14 may include items such as a personal computer owned by a user or a server capable of receiving data from a plurality of users. Photo images taken by the digital camera with an automatic image transmission function 10 may be transmitted to the image-receiving terminal 14. The photo images received by the image-receiving terminal 14 may be used for editing a photo album for example.

Figure 6:
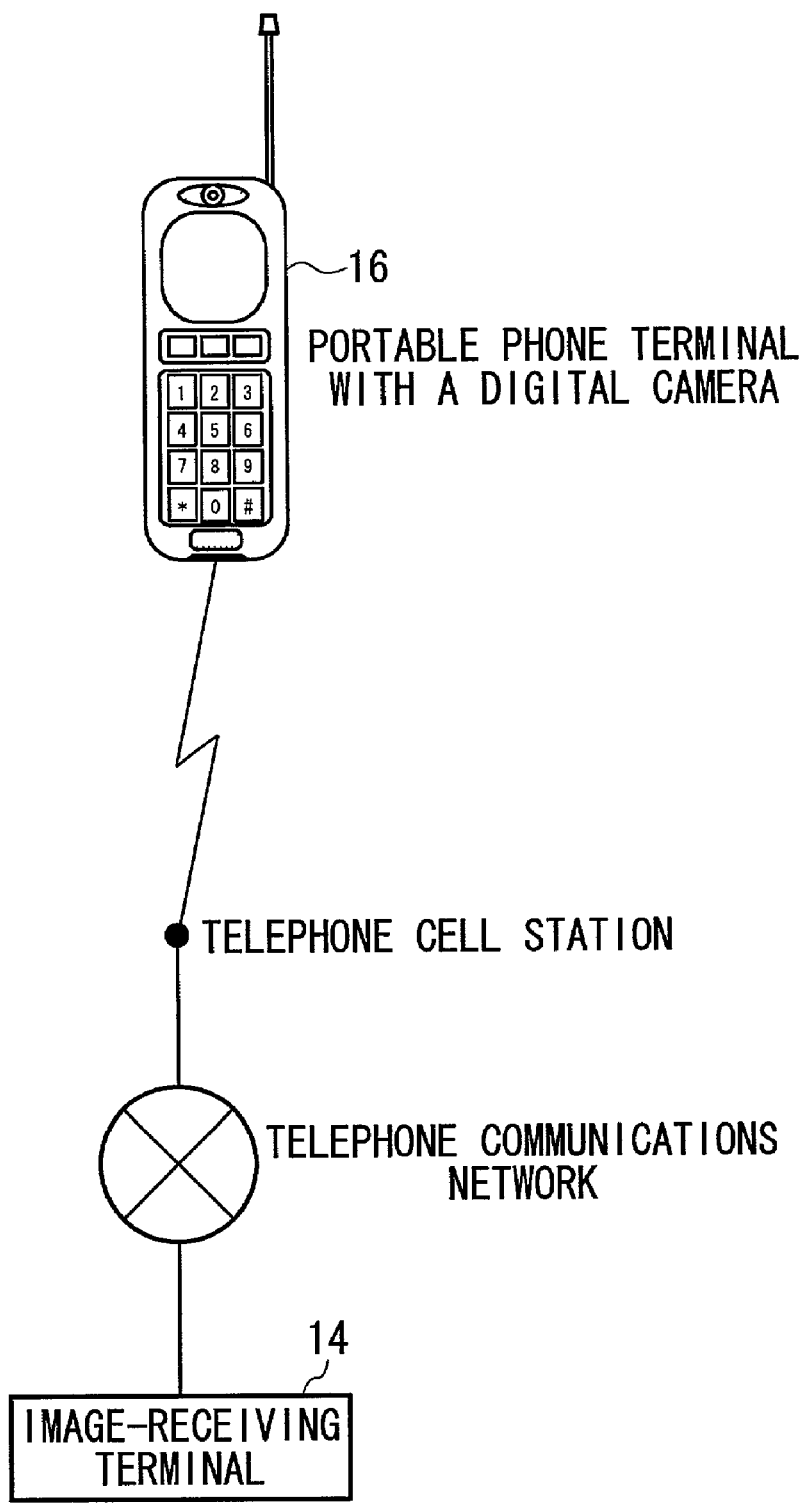
FIG. 6 is a schematic representation of the structure of a system used for another embodiment of a portable terminal with a digital camera of the present invention.

The wireless communication means may include a short distance wireless communication technology, such as Bluetooth. In FIG. 1, the cellular phone 12 intermediates communication between the digital camera with an automatic image transmission function 10 and the image-receiving terminal 14. In this case, Bluetooth is used for the communication between the digital camera with an automatic image transmission function 10 and the cellular phone 12. However, the digital camera with an automatic image transmission function 10 may directly communicate with the image-receiving terminal 14 without the cellular phone 12. In this case, as shown in FIG. 6, the digital camera with an automatic image transmission function 10 may be an electronic device having a combination of an image capturing function and a signal transmission function, such as a portable phone terminal with a digital camera 16.

First, the basic structures of the digital camera with an automatic image transmission function 10 will be described. Then, the process of an automatic transmission of images, which is a feature of the present invention, will be described in detail.

Figure 2:
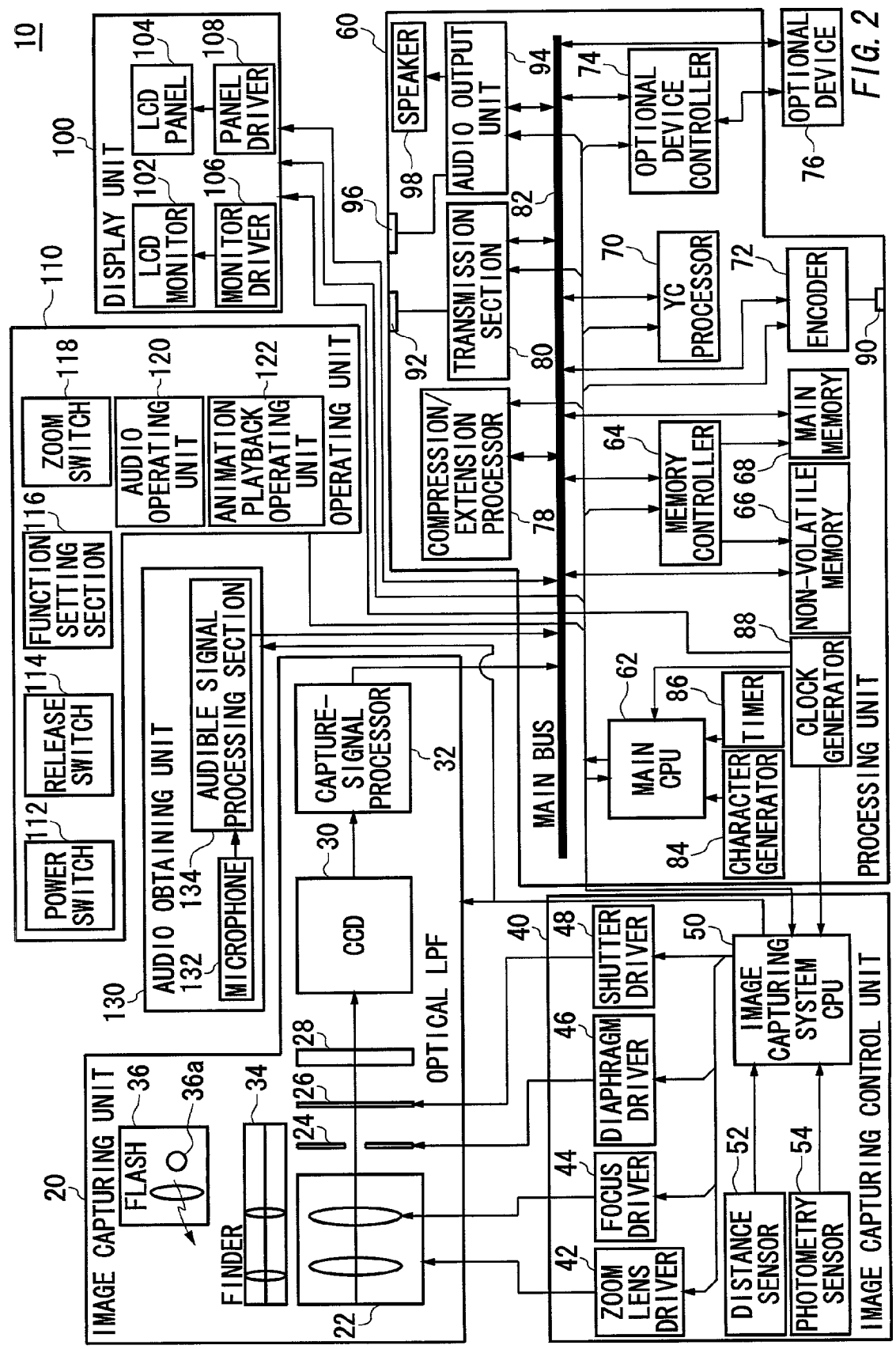
FIG. 2 is a block diagram showing a simplified structure of the digital camera with an automatic image transmission function of the present invention.

FIG. 2 is a block diagram showing a simplified structure of the digital camera with an automatic image transmission function 10. A digital camera with an automatic image transmission function 10, according to the present embodiment, records and plays back animations and audios as well as takes still pictures. The digital camera with an automatic image transmission function 10 includes an image capturing unit 20, an audio obtaining unit 130, a control unit 40, a processing unit 60, a display unit 100, and an operating unit 110.

The image capturing unit 20 includes structural and electrical members pertaining to photographing and image forming. That is, image capturing unit 20 is comprised of a lens section 22, which captures an image and processes the captured image, a diaphragm 24, a shutter 26, an optical LPF or low pass filter 28, a CCD 30, and a capture-signal processor 32. The lens section 22 preferably includes a focus lens and a zoom lens. The structure makes it possible to form an image of an object on the surface of the light reception of the CCD 30. Each sensor element of the CCD 30, though it is not shown in FIG. 2, stores electric charge (referred to as "stored electric charge"). The stored electric charge is taken by a read gate pulse to a shift register not shown in FIG. 2, and subsequently taken out sequentially with a register transfer pulse as a voltage signal.

Since the digital camera with an automatic image transmission function 10 generally has an electric shutter function, a mechanical shutter such as the shutter 26 is not always necessary. A shutter drain is set up in the CCD 30 through a shutter gate in order to achieve the electric shutter function. When the shutter gate is activated, the stored electric charge is drained to the shutter drain. Shutter speed, which is the time to store the electric charge in each sensor element, can be controlled by controlling the shutter gate.

The voltage signal output from the CCD 30, that is, an analog signal, is color-separated by the capture-signal processor 32 into R, G and B elements, and the white balance is adjusted. The capture-signal processor 32 then undertakes a gamma correction, sequentially converts the R, G and B signals from analog into digital form by the necessary timing, and outputs the obtained digital image data (referred to as "digital image data") to the processing unit 60.

The image capturing unit 20 further includes a finder 34 and an electronic flash 36. The finder 34 may be equipped with an LCD not shown in FIG. 2. In that case, the finder 34 displays various types of information provided by a main CPU 62 described later. The electronic flash 36 acts to emit light when the energy stored in a capacitor, not shown in FIG. 2, is supplied to a discharge tube 36a.

The audio obtaining unit 130 includes structural and electrical members for obtaining external sounds. The audio obtaining unit 130 is comprised of a microphone 132, which catches sounds and processes, and an audible signal processing section 134. The audible signal processing section 134 converts audible signals, which the microphone 132 has caught, from analog to digital in the required timing and outputs the obtained audio data (hereinafter referred to as "digital audio data"), to the processing unit 60. The audible signal processing unit 134 may undertake such processes as to reduce noises and to adjust voice levels.

The control unit 40 is comprised of a zoom lens driver 42, a focus driver 44, a diaphragm driver 46, a shutter driver 48, an image capturing system CPU 50, which controls all of the above-mentioned drivers, a distance sensor 52, and a photometry sensor 54. Each of the drivers such as the zoom lens driver 42 has a driving means such as a stepping motor or the like. In response to a snap of a release switch 114 described later, the distance sensor 52 gauges the distance defined between the camera and the object, and the photometry sensor 54 measures the brightness of the object. The gauged distance data (referred to as "gauged distance data") and the measured brightness data of the object (referred to as "measured luminance data") are transmitted to the controlling system CPU 50. The controlling system CPU 50 controls the zoom lens driver 42 and the focus driver 44 based on the photograph information provided by a user such as the magnification of the zoom lens, and makes adjustments of the magnification of the zoom lens and focus for the lens section 22.

The controlling system CPU 50 determines an aperture value and a shutter speed, based on the integrated value of digital signals of RGB in one image frame, which is called AE information. According to the aperture value and the shutter speed thus determined, the diaphragm driver 46 and the shutter driver 48 respectively adjust the amount of aperture and then drive the shutter 26 to open and close.

The controlling system CPU 50 also controls the emission of light intensity from the electronic flash 36 based on the measured brightness data, and simultaneously adjusts the amount of aperture of the diaphragm 24. When a user instructs a camera to pick up an image, the CCD 30 starts to store the electric charge. Then, the stored electric charge is output to the capture-signal processor 32 after the expiration of the shutter time calculated on the basis of the measured brightness data.

The processing unit 60 is comprised of a main CPU 62, which controls the whole digital camera with an automatic image transmission function 10, especially controlling the processing unit 60 itself, a memory controller 64, which is controlled by the main CPU 62, a YC processor 70, an optional device controller 74, a compression/extension processor 78, a transmission section 80, and an audio output unit 94. The main CPU 62 notifies necessary information with the image capturing system CPU 50 by serial communication, for example. A clock generator gives an operating clock of the main CPU 62. The clock generator 88 also provides clocks of different frequencies respectively to the image capturing system CPU 50 and the display unit 100.

The main CPU 62 is also comprised of a character generator 84 and a timer 86. The timer 86 is backed up by batteries and continuously counts the time and date. This count value gives the main CPU 62 information about the time and date of a photograph and other time information. The character generator 84 generates character information such as the time and date of a photograph or a title. This character information will then be appropriately superimposed with a photographic image.

The memory controller 64 controls a non-volatile memory 66 and a main memory 68. The non-volatile memory 66 is comprised of components such as an EEPROM or electrically-erasable programmable ROM, and a flash memory. The non-volatile memory 66 stores data such as setting information set by a user or an adjustment value before shipment, which should be kept even when the power of the digital camera with an automatic image transmission function 10 is turned off. The non-volatile memory 66 may store a boot program or a system program of the main CPU 62 if necessary. On the other hand, the main memory 68 may generally be a relatively inexpensive memory having a large capacity such as a DRAM. The main memory 68 has: a frame memory function, which stores data output from the image capturing unit 20 and the audio obtaining unit 130; a system memory function, which is loaded with various programs; and a work area function. The non-volatile memory 66 and the main memory 68 control the transmission of data back and forth among the components at the inside and outside of the processing unit 60 via a main bus 82.

The YC processor 70 undertakes a Y-to-C conversion on digital image data and generates a luminance signal Y and a chrominance signal B-Y and R-Y. The memory controller 64 temporarily stores the luminance signal and the chrominance signal in the main memory 68. The compression/extension processor 78 sequentially reads the luminance signal and the chrominance signal from the main memory 68. The compression/extension processor then compresses the luminance signal and the chrominance signal. A memory card, which is one kind of the optional device 76, writes through the optional device controller 74 the compressed data described above (referred to as "compressed data").

The processing unit 60 further includes an encoder 72. The encoder 72 inputs a luminance signal and a chrominance signal. Then, the encoder 72 converts the luminance signal and the chrominance signal into video signals such as National Television System Committee (NTSC) and Phase Alternation by Line (PAL) signals. The encoder 72 outputs the converted video signals through a video output terminal 90. In order to generate a video signal from the data recorded in the optional device 76, firstly the data is transmitted to the compression/extension processor 78 through the optional device controller 74. Then, the data, which has been subjected to a necessary process by the compression/extension processor 78, is converted into a video signal by the encoder 72.

The optional device controller 74 undertakes a generation of necessary signals, a logic conversion, and a voltage conversion, between the main bus 82 and the optional device 76. If an external storage device such as a memory card is connected as the optional device 76, reading and writing of data can be undertaken through the same data bus. In this case, an external storage device control unit as an example of the optional device controller 74 controls reading and writing data through the same data bus. The digital camera with an automatic image transmission function 10 may support, for example, an I/O card, which is a standard PCMCIA-compliant card, other than the above-described memory card, as an optional device 76. In this case, the optional device controller 74 may include a bus control LSI for PCMCIA.

The transmission section 80 functions to control such as a protocol conversion based on a communication specification for which the digital camera with an automatic image transmission function 10 supports, that is, a specification such as USB, RS-232C, or Ethernet, for example. The transmission section 80 may be provided with a driver IC if necessary, and communicates through external devices including networks and an antenna 92, for example. Other than those standard specifications, the transmission section 80 can have a structure which exchanges data, through a particular interface, with an external device such as a printer, a karaoke device, or a game device. Further, the transmission section 80 is capable of exchanging data with apparatuses supporting Bluetooth, such as a cellular phone, by using a short distance wireless communication technology, such as Bluetooth.

The audio output unit 94 undertakes the process to output audio data, which is read from the main memory 68 or the optional device 76, to an external device such as headphones, through a speaker 98 or a connection terminal 96. In particular, processing for a digital-analog conversion, a stretch, and amplification, for example, are conducted. A part of, or all of, these processes may be undertaken by the main CPU 62.

The display unit 100 is comprised of an LCD monitor 102 and an LCD panel 104. A monitor driver 106 and a panel driver 108 respectively control the LCD monitor 102 and the LCD panel 104. The LCD monitor 102 may be, for example, a 2-inch monitor, and is set in the back of a camera. The LCD monitor 102 displays the modes of the present photographs and plays, magnification of the zoom lens for photographing and playing, the amount of energy left in batteries, time and date, a display for setting a mode, and subject images. The LCD panel 104 may be, for example, a small monochrome LCD, and is set on the top of a camera. The LCD panel 104 simply displays information such as the image quality described as FINE/NORMAL/BASIC, on/off of the electronic flash, the standard number of possible photographs, the number of pixels, and the amount of power left in the batteries.

The operating unit 110 is comprised of apparatuses and electric members, which are necessary for a user to set or instruct the operation or the mode of the operation of the digital camera with an automatic image transmission function 10. The power switch 112 determines whether the power of the digital camera with an automatic image transmission function 10 is turned on or off. The release switch 114 has a two-step structure of switch positions, including two switches to be operated respectively in the two types of position state: the half-position state and the full-position state. For example, the half-position switch undertakes a recording quality adjustment processing, such as an auto focus and auto exposure. Subsequently, the full-position switch captures data such as an image and audio.

Then, after necessary processes such as signal processing and the compression of data, the captured image will be stored in the main memory 68 or the optional device 76. The operating unit 110 may have a setting such as a rotary dial for mode or a cross key other than the power switch 112 and the release switch 114. The dial for mode and the cross key are collectively referred to as a function setting section 116 as in FIG. 2. The zoom switch 118 is operated to set the zoom magnification. Examples of an operation or a function include "file format", "special effects", "photographic printing", "confirm/save", and "display switching", which can be designated by using the operating unit 110. The audio operating unit 120 includes an operational key for playing audio data. An animation playback operating unit 122 includes an operational key for playback of animation data. The audio operating unit 120 an the animation playback operating unit 122 include keys such as "play", "stop", "forward", "backward", "invert", and "pause", as examples.

The main operations according to the structures described above are as follows.

First, a power switch 112 of the digital camera with an automatic image transmission function 10 is turned on. Electric power is supplied to each part of the camera. The main CPU 62 judges the mode of the digital camera with an automatic image transmission function 10, by reading the state of the function setting section 116. The mode is selected from among a still picture photograph mode, a still picture play mode, an animation photograph mode, an animation play mode, a music play mode, a function setting mode, and a data transfer mode.

If the digital camera with an automatic image transmission function 10 is in the still picture photograph mode, the main CPU 62 monitors the half-position state of the release switch 114. When the main CPU 62 detects the half-position state, the main CPU 62 obtains photometry data and distance data from the photometry sensor 54 and the distance sensor 52, respectively. The control unit 40 operates based on the obtained data, and adjustments, such as focus and an aperture of the photographic lens 22, are made. When the adjustments are completed, the main CPU 62 displays letters such as "standby" on the LCD monitor 102 to notify the state to a user.

Then, the main CPU 62 monitors the full-position state of the release switch 114. When the release switch 114 is pressed to the full-position, the shutter 26 is closed after a predetermined shutter time, and the stored electrical charge of the CCD 30 is drained to the image capturing signal processor 32. The digital image data generated by the result of the process undertaken by the image capturing signal processor 32 is output to the main bus 82. The generated digital image data is temporarily stored in the main memory 68. Then, the stored digital image data is processed at the YC processor 70 and the compression/extension processor 78. The processed digital image data is recorded in the optional device 76 via the optional device controller 74. The recorded digital image data is displayed on the LCD monitor 102 in the frozen state for a period of time. Therefore, a user can check the photographed image. This process completes a series of photographing operations.

If the digital camera with an automatic image transmission function 10 is in the still picture play mode, the main CPU 62 reads image data of the picture taken last time from the main memory 68 through the memory controller 64. The main CPU 62 then displays the image on the LCD monitor 102 of the display unit 100. If a user instructs "next" or "back" at the function setting section 116, a photographed image taken before and after the presently displaying image is displayed on the LCD monitor 102.

If the digital camera with an automatic image transmission function 10 is in the animation photograph mode, the main CPU 62 monitors the half-position state of the release switch 114. When the main CPU 62 detects the half-position state, the main CPU undertakes a recording quality adjustment processing as in the still picture photograph mode described above. The main CPU then monitors the full-position state of the release switch 114. When the release switch 114 is pressed to the full-position state, the stored electric charge of the CCD 30 is drained to the image capturing signal processor 32 based on the predetermined synchronized signal. Digital image data is sequentially stored in the optional device 76 by undertaking the same processes as in the still picture photograph mode. At the same time, audio data obtained by the audio obtaining unit 130 is sequentially stored in the optional device 76. The main CPU 62 monitors the half-position state of the release switch 114 while recording animation. When the main CPU 62 detects the half-position state, the main CPU 62 stops recording animation and audio.

If the digital camera with an automatic image transmission function 10 is in the animation play mode or the music play mode, the main CPU 62 reads animation data or audio data from the optional device 76 through the optional device controller 74, based on the instruction of a user, which is communicated by the operating unit 110. For animation data, the animation data is given necessary processes at the compression/extension processor 78, the YC processor 70, and the audio output unit 94. The image of the animation data is then displayed on the LCD monitor of the display unit 100. Audio is then output to the headphone connection terminal 96 or the speaker 98. For audio data, the audio data is given processes necessary for outputting audio at the audio output unit 94. The audio is output to headphones through the headphone connection terminal 96. The voice may be output to the speaker 98. A user communicates the instructions, such as "play", "stop", "forward", "backward", "inverse", and "pause," through the function setting section 116, the audio operating unit 120, or the animation playback operating unit 122. Thus, a user can play desired data.

The description above was about the basic structures of the digital camera with an automatic image transmission function 10. The following description is about the automatic transmission of images, which is a feature of the present invention.

Figure 4:
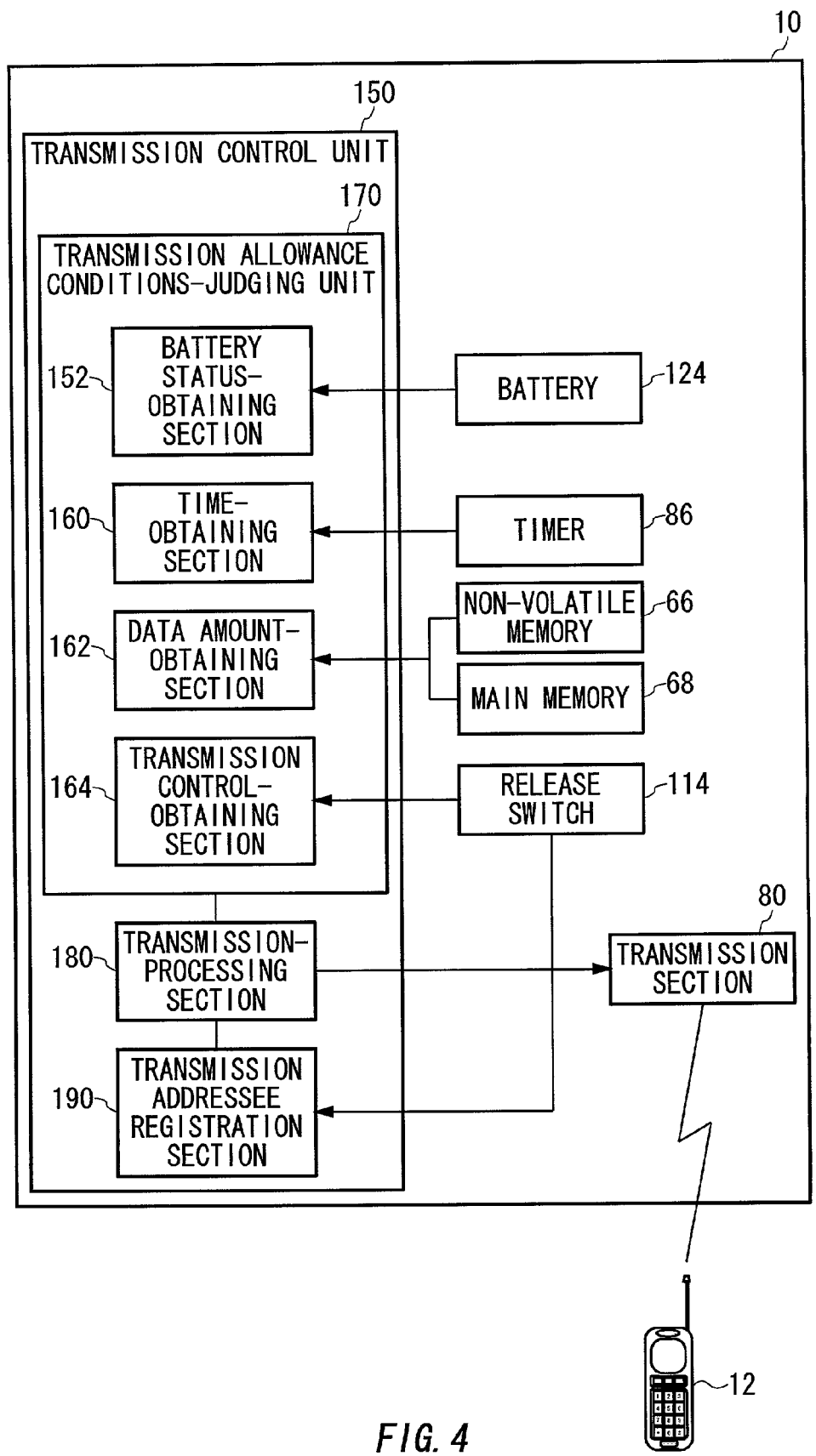
FIG. 4 is a functional diagram of the transmission control unit in the digital camera with an automatic image transmission function according to the first embodiment of the present invention.

First, a first embodiment of the present invention will be described. FIG. 4 is a schematic representation of the functions of a transmission control unit 150 according to the present embodiment. The processing unit 60 (see FIG. 2) includes the transmission control unit 150 for automatically transmitting images from the digital camera 10 according to the present embodiment. The main CPU 62 (see FIG. 2) appropriately functions with a program stored or loaded in the main memory 68 and/or the non-volatile memory 66. The transmission control unit 150 controls a processing to automatically transmit images stored in the non-volatile memory 66 or the main memory 68 to the outside of the digital camera with an automatic image transmission function 10, through the transmission section 80.

The transmission control unit 150 according to the present embodiment includes a transmission allowance conditions-judging unit 170, a transmission-processing section 180, and a transmission addressee registration section 190.

The transmission-processing section 180 executes a transmission process of images when the transmission allowance conditions-judging unit 170 judges that a predetermined condition for transmitting images (referred to as a "transmission allowance condition" hereinafter) is satisfied. Then, the transmission section 80, including a converter and an antenna, transmits the processed images to the cellular phone 12. The transmission allowance conditions-judging unit 170 includes a battery status-obtaining section 152, a time-obtaining section 160, a data amount-obtaining section 162, and a transmission control-obtaining section 164. The transmission allowance conditions-judging unit 170 obtains information necessary for judging the transmission allowance conditions.

One of the examples of the transmission allowance conditions is the condition that the photographing has been completed. It means that the transmission process of photographed images is automatically undertaken when a user finishes photographing. The time when the user finishes photographing is such as when photographed images are stored in the non-volatile memory 66 or the main memory 68. The user may also set a delay of time, which is a predetermined time after images are stored in the memory. The transmission-processing section 180 may undertake the transmission process during the period of time when the next photographing has not been started.

There are other conditions as described in the following in addition to the above-described conditions for the transmission allowance conditions.

Since the image transmission after finishing photographing does not apply to every case, other transmission allowance conditions are added to consider the other cases.

The digital camera with an automatic image transmission function 10 has a battery 124, which supplies electric power to each unit. The transmission allowance conditions-judging unit 170 obtains the electrical storage status of the battery 124 from the battery status-obtaining section 152. Then, the transmission allowance conditions-judging unit 170 judges whether or not the obtained electrical storage status is within a predetermined status. The predetermined electrical storage status is, for example, when the battery 124 can charge up to 2V and has an electromotive force of more than 1.8V. If the transmission allowance conditions-judging unit 170 judges that the battery 124 is in a predetermined storage level, the transmission allowance conditions-judging unit 170 notifies the transmission-processing section 180 of the allowance for transmitting images. If the transmission allowance conditions-judging unit 170 judges that the battery 124 is not in a predetermined storage level such that when, even though the battery 124 was in a predetermined storage level before photographing images, the status of the battery 124 turns below the predetermined storage level after the photographing, transmission of images is not allowed.

Moreover, another transmission allowance condition that can save communication costs required for transmitting images is added.

The transmission allowance conditions-judging unit 170 obtains time from the timer 86 through the time-obtaining section 160. Then, the transmission allowance conditions-judging unit 170 judges whether or not to transmit images based on the obtained time. For example, the transmission allowance conditions-judging unit 170 may allow transmitting images during the night when communication cost is cheaper, instead of transmitting images during the day when cost for communication is generally higher. Thus, the communication cost may be saved. Further, the time-obtaining section 160 may also obtain specific time data, such as a date or day.

For saving the communication cost, the transmission allowance condition described below may also be added.

The data amount-obtaining section 162 obtains the amount of image data to be transmitted from the non-volatile memory 66 and/or the main memory 68. The transmission allowance conditions-judging unit 170 calculates the cost for transmitting data based on the obtained data amount. The calculation of the cost for transmitting data is undertaken in the following manner, for example. If transmission cost is calculated based on communication time, the cost becomes equal to the communication cost per unit time times data amount divided by the data communication speed, using previously registered data communication speed and communication cost per unit time. If the calculated transmission cost falls within a predetermined amount, the image transmission is allowed. However, if the data amount is above the predetermined amount, the data amount of images to be transmitted may be transmitted only after being compressed to a data amount that falls within the predetermined amount. Therefore, communication cost may be saved. Further, information relating to the communication cost maybe updated via the telephone communication line.

Furthermore, for another transmission allowance condition relating to saving communication costs, there is a condition in which the communication cost is calculated for each unit time.

Figure 3:
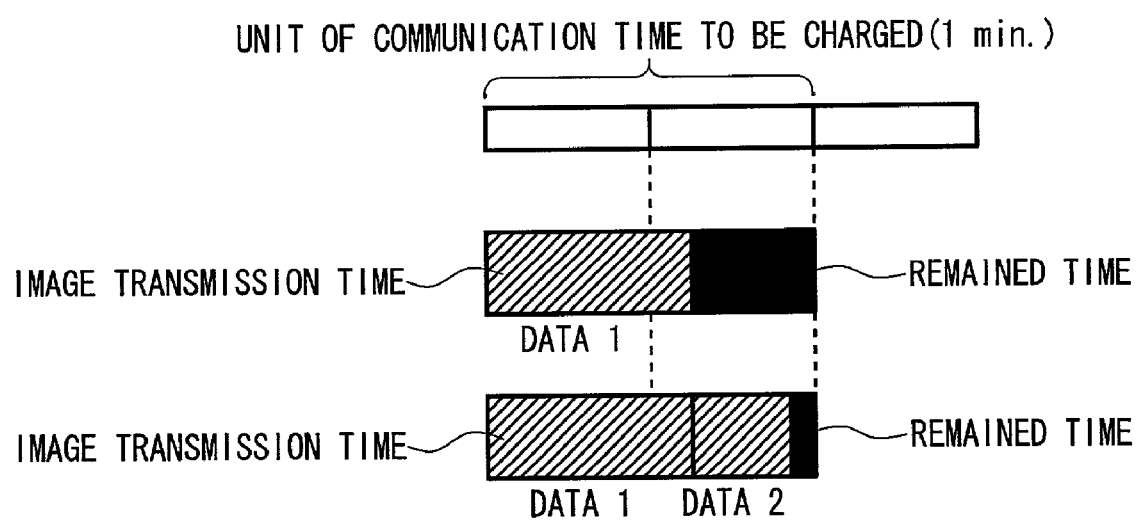
FIG. 3 is a diagram showing the relationship between a charge time and an image transmission time.

In order to describe this condition, FIG. 3 is used in the following. FIG. 3 is a diagram showing the relationship between a charge time and an image transmission time. In this case, the charge for communication is made by a unit time. For example, 10 yen is charged per minute of the communication time. Suppose the time required for transmitting data 1 is 1.25 minute and 0.6 minute for that of data 2. The transmission time of data 1 requires two pieces of unit time as one piece of unit time is not enough. Thus, 0.75 minute is the remaining time not used for actually transmitting data. The transmission allowance conditions-judging unit 170 calculates the remaining time and does not allow a transmission if the remaining time is more than a predetermined remaining time. For example, if the predetermined remaining time was set as 0.5 minute, data 1 is not transmitted by itself since the remaining time for data 1 is 0.75 minute. The transmission allowance conditions-judging unit 170 recalculates the remaining time of the data amount by adding to the data amount yet-to-be transmitted the data amount that comes next and judges the remaining time in the same manner as for data 1 described above. For example, when there is data 2 as data to be transmitted after data 1, the transmission time for the sum of the data amount becomes 1.85 minute and the remaining time 0.15 minute. Since the remaining time is within the predetermined remaining time, the transmission of data 1 and data 2 together is allowed. If the transmission time for the sum of the data amount of the yet-to-be transmitted data reaches to a predetermined amount, the data may be automatically transmitted. For example, when the transmission time for the sum of the data amount reaches to three minutes, a transmission is undertaken regardless of the remaining time. Thus, unproductive communication costs may be reduced.

Referring back to FIG. 4, a function of a user's selecting images to be transmitted is described in the following.

Among the photographed pictures, there are pictures that fail as good photographs and that a user does not like. The user sometimes does not desire to transmit these pictures. So, the transmission control unit 150 further includes a transmission control-obtaining section 164 and obtains instructions for controlling image transmissions, which instructions are made by the user. The instructions to control image transmissions are made by the operation of the release switch 114. The transmission allowance conditions-judging unit 170 allows a transmission of images when there is no control instruction of the image transmission. On the other hand, the transmission allowance conditions-judging unit 170 does not allow a transmission of images when there is a control instruction of the image transmission.

The transmission control section 150 includes a transmission addressee registration section 190 for undertaking a control relating to the settings of addressees of transmissions. The transmission addressee registration section 190 accepts a registration of phone numbers of addressees made by the operation of the release switch 114. The accepted phone numbers are sent to the cellular phone 12 and are used for communication. Thus, since the user only has to operate the digital camera with an automatic image transmission function 10, and does not have to operate the cellular phone 12, when setting a phone number of an addressee to be transmitted, a troublesome task may be skipped.

The main memory 68 (volatile memory) and the non-volatile memory 66 store photographed photo images. The main memory 68 provides the stored photo images to the transmission control section 150. After the photo images are provided, the photo images are erased from the main memory 68. Thus, images that have already been transmitted may be read from the non-volatile memory 66.

Figure 8:
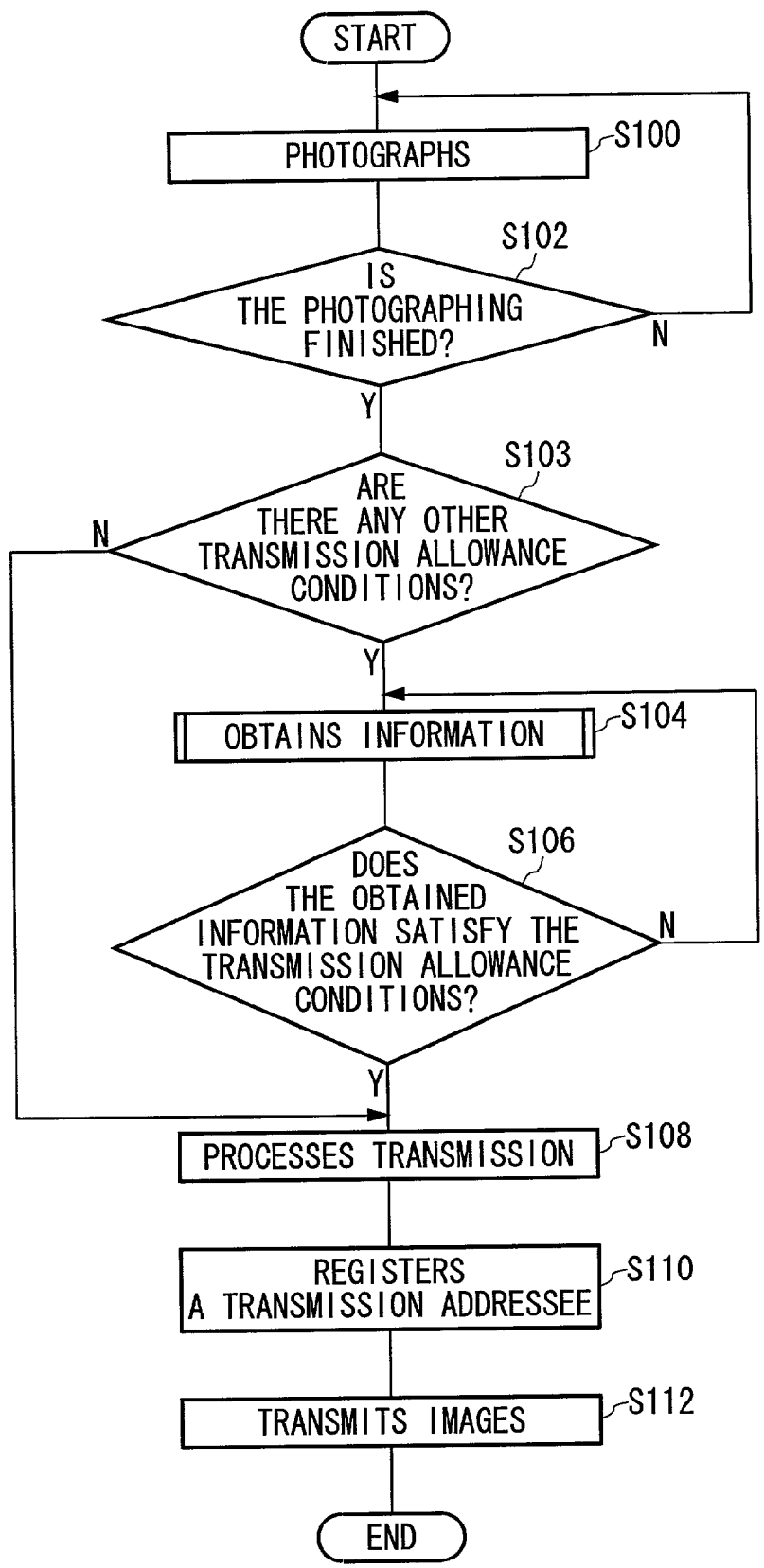
FIG. 8 is a flowchart showing the process of an automatic image transmission undertaken by the digital camera with an automatic image transmission function according to the first embodiment of the present invention.

FIG. 8 is a flowchart showing the process of an automatic image transmission undertaken by the digital camera with an automatic image transmission function 10 according to the present embodiment. First, the digital camera with an automatic image transmission function 10 photographs images, at S100. When the completion of photography is confirmed, "Y" at S102, and if there are transmission allowance conditions other than the completion of photographs, "Y" at S103, the transmission allowance conditions-judging unit 170 obtains information necessary for judging a predetermined transmission allowance condition, at S104. If a user has not finished photographing, "N" at S102, the user continues to photograph. After the transmission allowance conditions-judging unit 170 obtains predetermined information, the transmission allowance conditions-judging unit 170 judges whether or not the obtained information satisfies the transmission allowance condition, at S106. The transmission process is not undertaken until the transmission allowance condition is satisfied. At S103, when there are no transmission allowance conditions other than the completion of photography, the transmission-processing section 180 is notified that the images are transmittable, and the transmission process is undertaken, at S108. At S106 also, when the transmission allowance condition is satisfied, the transmission-processing section 180 is notified that the transmission allowance condition is satisfied, and the transmission process is undertaken, at S108. Then, the transmission addressee registration section 164 accepts a registration of a phone number of an addressee by operating the release switch 114, at S110. Finally, the transmission section 80 is notified with the contents of the transmission process, and appropriate images are transmitted, at S112. Then, the automatic image transmission according to the present embodiment completes with the process described above.

Figure 9:
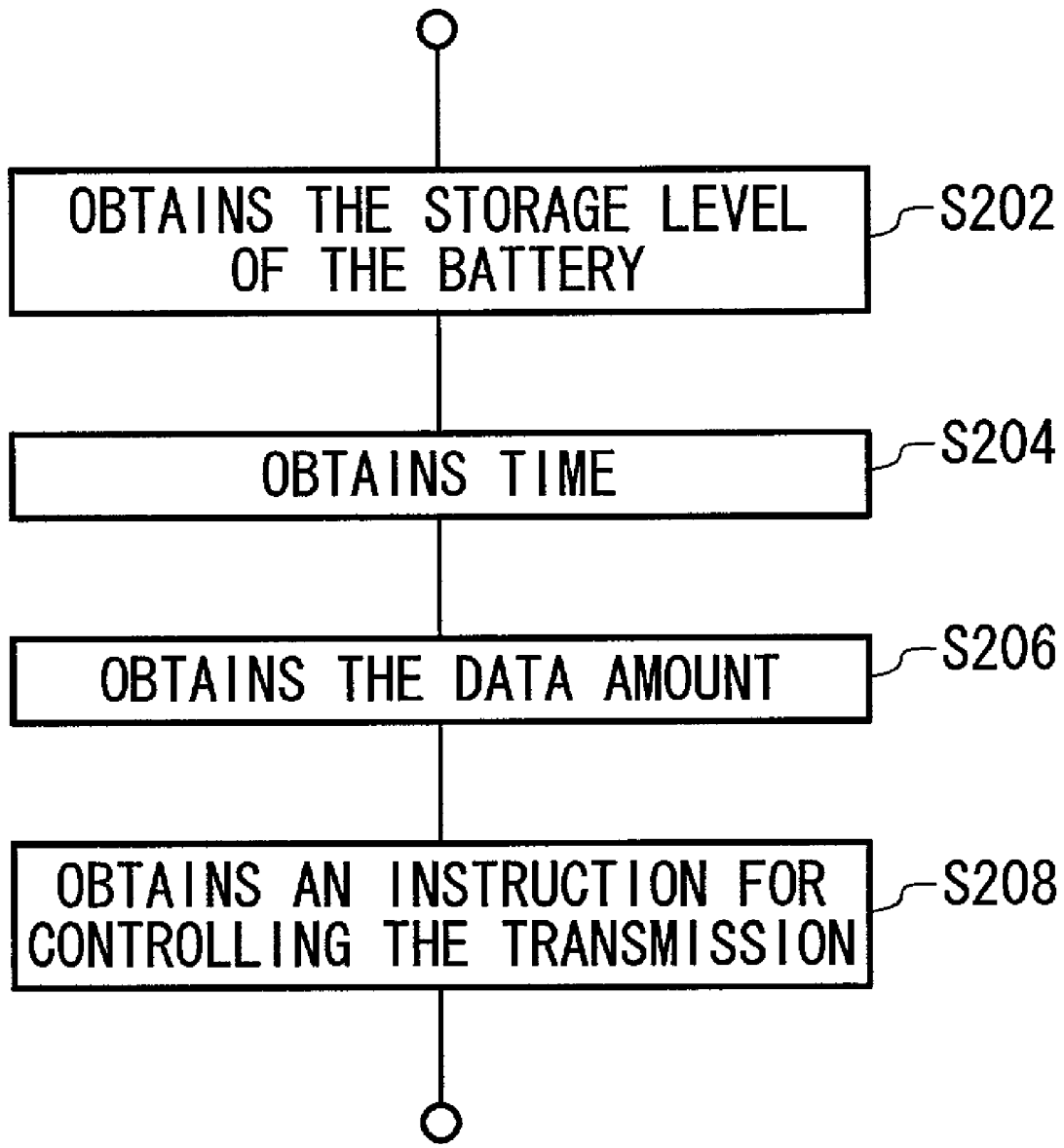
FIG. 9 is a flowchart showing the detailed process of obtaining information at S104 in FIG. 8.

FIG. 9 is a flowchart showing the detailed process of obtaining information at S104 in FIG. 8. The transmission allowance conditions-judging unit 170 first obtains an electrical storage status of the battery 124 through the battery status-obtaining section, at S202. Then, the transmission allowance conditions-judging unit 170 obtains time from the timer 86 through the time-obtaining section 160, at S204. The transmission allowance conditions-judging unit 170 then obtains the data amount of images from the non-volatile memory 66 and the main memory 68 through the data amount-obtaining section 162, at S206. Finally, transmission allowance conditions-judging unit 170 obtains from a user the instruction for controlling a transmission of images through the transmission control-obtaining section 164, at S208. The steps of obtaining information for the transmission allowance conditions according to the present embodiment completes with the process described above.

As described above, by automatically transmitting the images photographed by the digital camera with an automatic image transmission function 10 based on a predetermined transmission condition, a user may be able to transmit images faster and more reliably with a cheaper communication cost.

Next, a second embodiment of the present invention is described in the following.

Figure 5:
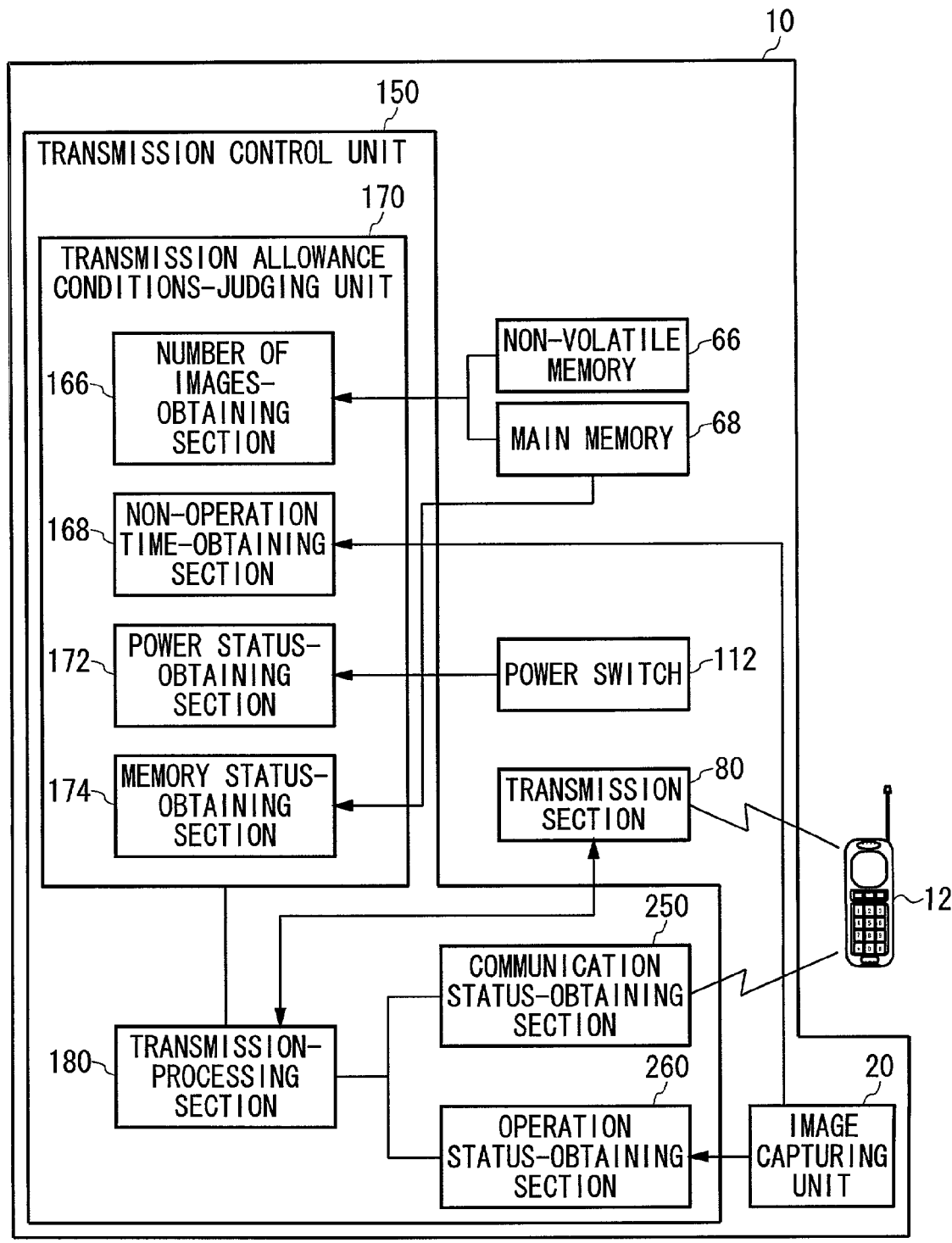
FIG. 5 is a functional diagram of the transmission control unit in the digital camera with an automatic image transmission function according to the second embodiment of the present invention.

FIG. 5 is a schematic representation of the function of the transmission control unit 150 according to the second embodiment. The transmission control unit 150 according to the present embodiment may start transmitting images automatically when conditions that makes it possible to transmit images are satisfied. The transmission allowance conditions-judging unit 170 judges the transmission allowance conditions and instructs the transmission-processing section 180 to undertake a transmission process in a predetermined transmission allowance condition. The transmission allowance conditions-judging unit 170 includes a number of images-obtaining section 166, a non-operation time-obtaining section 168, a power status-obtaining section 172, and a memory status-obtaining section 174. The transmission allowance conditions-judging unit 170 obtains information necessary for judging the transmission allowance conditions using the above sections. The transmission allowance conditions appropriate for an image transmission are described in the following.

The number of images-obtaining section 166 obtains the number of photo images that have not yet been transmitted, which photo images are stored in the non-volatile memory 66 and the main memory 68. When the number reaches to a predetermined number, the transmission allowance conditions-judging unit 170 instruct the transmission-processing section 180 to undertake an image transmission. The user may change the set predetermined number, according to the user's preference. Thus, since the user can send a plurality of images all at one time, an effective transmission process may be undertaken.

The non-operation time-obtaining section 168 obtains the time, which is the period of time that is not used for other operations since the photography operation, such as a shutter operation made by the image-capturing unit 20. When the non-operation time reaches to a predetermined period of time, the transmission allowance conditions-judging unit 170 instructs the transmission-processing section 180 to undertake an image processing and makes the transmission section 80 transmit the images. For example, if the transmission allowance conditions-judging unit 170 instructs an image transmission when the non-operation time reaches to 10 seconds, the shutter operation will not be interrupted by the image transmission since the image transmission will not be instructed while the shutter operation is continuously taken within 10 seconds.

The power status-obtaining section 172 obtains a power status of the digital camera with an automatic image transmission function 10 from the status of the power switch 112. When the power is turned off and photo images to be transmitted are still stored in a memory, the transmission allowance conditions-judging unit 170 instructs the operation-processing section 180 to undertake an image transmission. The transmission-processing section 180 transmits the plurality of photo images to be transmitted all at one time. The transmission control unit 150 undertakes a process to turn off the power after completing the transmission. Thus, since all of the photo images to be transmitted are automatically transmitted by turning off the power, the user may avoid forgetting to transmit images.

Further, another transmission allowance condition relating to the on and off of the power is described in the following.

When the power is turned on and photo images to be transmitted are still stored in the non-volatile memory 66, the transmission allowance conditions-judging unit 170 may instruct the transmission-processing section 180 to undertake an image transmission. Thus, photo images to be transmitted may be transmitted reliably when the camera 10 is used the next time.

The memory status-obtaining section 174 obtains the data amount and the number of images, stored in the main memory 68. When the data amount and the number of images reach to a predetermined amount, the transmission allowance conditions-judging unit 170 instructs the transmission-processing section 180 to undertake an image transmission. When the transmission process is undertaken, the images that were stored first in the main memory 68 are given priority. Thus, a certain amount of remaining capacity of the main memory 68 can always be assured and since the images photographed later are still stored in the main memory 68, the user may refer to the remaining photographed images.

The communication status-obtaining section 250 obtains information relating to whether the cellular phone 12 is capable of communication. When the cellular phone 12 can communicate, the transmission-processing section 180 automatically undertakes a transmission. For example, when the cellular phone 12 cannot communicate since it is in a place such as a tunnel, the transmission-processing section 180 does not undertake a transmission. Thus, the user may avoid a photography operation from being interrupted by the waiting status of the transmission process.

The operation status-obtaining section 260 monitors operations of the digital camera with an automatic image transmission function 10 such as a photography operation made by the image-capturing unit 20. When the operation status-obtaining section 260 detects an operation of the digital camera 10, such as a photography operation, while transmitting images, the image transmission is at once suspended. Then, the operation status-obtaining section 260 continues to monitor the photography operation, and when the operation status-obtaining section 260 affirms that the operation is not undertaken for a certain period of time, the suspended image transmission will be started again. Thus, a necessary photography operation may be achieved without waiting for the completion of an image transmission.

The user may freely select the transmission allowance conditions described above, according to the user's preferences. For example, when the user does not desire to consider an image transmission process while operating the camera 10, the user could set the camera 10 so as to transmit images only when the power is turned off.

The transmission-processing section 180 may also monitor the transmission speed through the transmission section 80 and may cancel the transmission when the speed falls short of a certain transmission speed.

Figure 10:
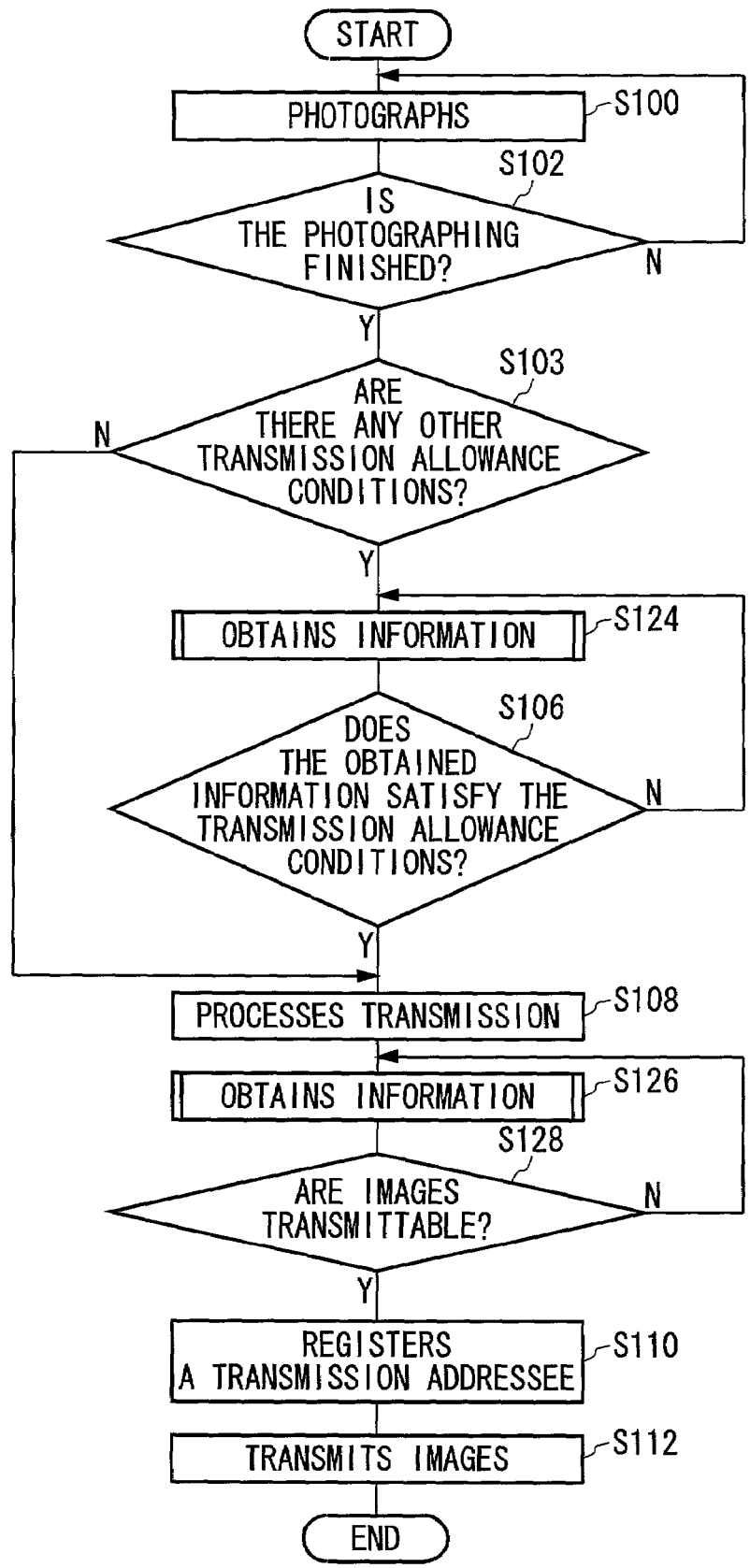
FIG. 10 is a flowchart showing the process of an automatic image transmission undertaken by the digital camera with an automatic image transmission function according to the second embodiment of the present invention.

FIG. 10 is a flowchart showing the process of an automatic image transmission undertaken by the digital camera with an automatic image transmission function 10 according to the present embodiment. First, the digital camera with an automatic image transmission function 10 photographs images, at S100. When the completion of photography is confirmed, "Y" at S102, and when there is another transmission allowance condition other than the completion of photography, "Y" at S103, the transmission allowance conditions-judging unit 170 obtains information necessary for judging a predetermined transmission allowance condition, at S124. When photography has not been completed, "N" at S102, the photography is continued. Next, after having obtained predetermined information, the transmission allowance conditions-judging unit 170 judges whether or not the predetermined transmission allowance condition is satisfied, at S106. The transmission process will not be undertaken until the transmission allowance condition is satisfied. At S103, when there is no other transmission allowance condition other than the completion of photography, the transmission-processing section 180 is notified that the images are transmittable and the transmission process is undertaken, at S108. At S106, also when the transmission allowance condition is satisfied, the transmission-processing section 180 is notified that the images are transmittable and the transmission process is undertaken, at S108. Next, the transmission allowance conditions-judging unit 170 obtains information for judging whether or not the digital camera with an automatic image transmission function 10 and the cellular phone 12 can communicate, at S126. Then, the transmission allowance conditions-judging unit 170 checks whether or not the images are transmittable, based on the obtained information, at S128. The transmission addressee registration section 164 accepts a registration of a phone number of the addressee for the transmission, which is registered by using the release switch 114, at S110. Finally, the transmission section 80 is notified of the contents of the transmission process and transmits appropriate images, at S112. The process of an automatic image transmission according to the present embodiment ends with the process described above.

Figure 11:
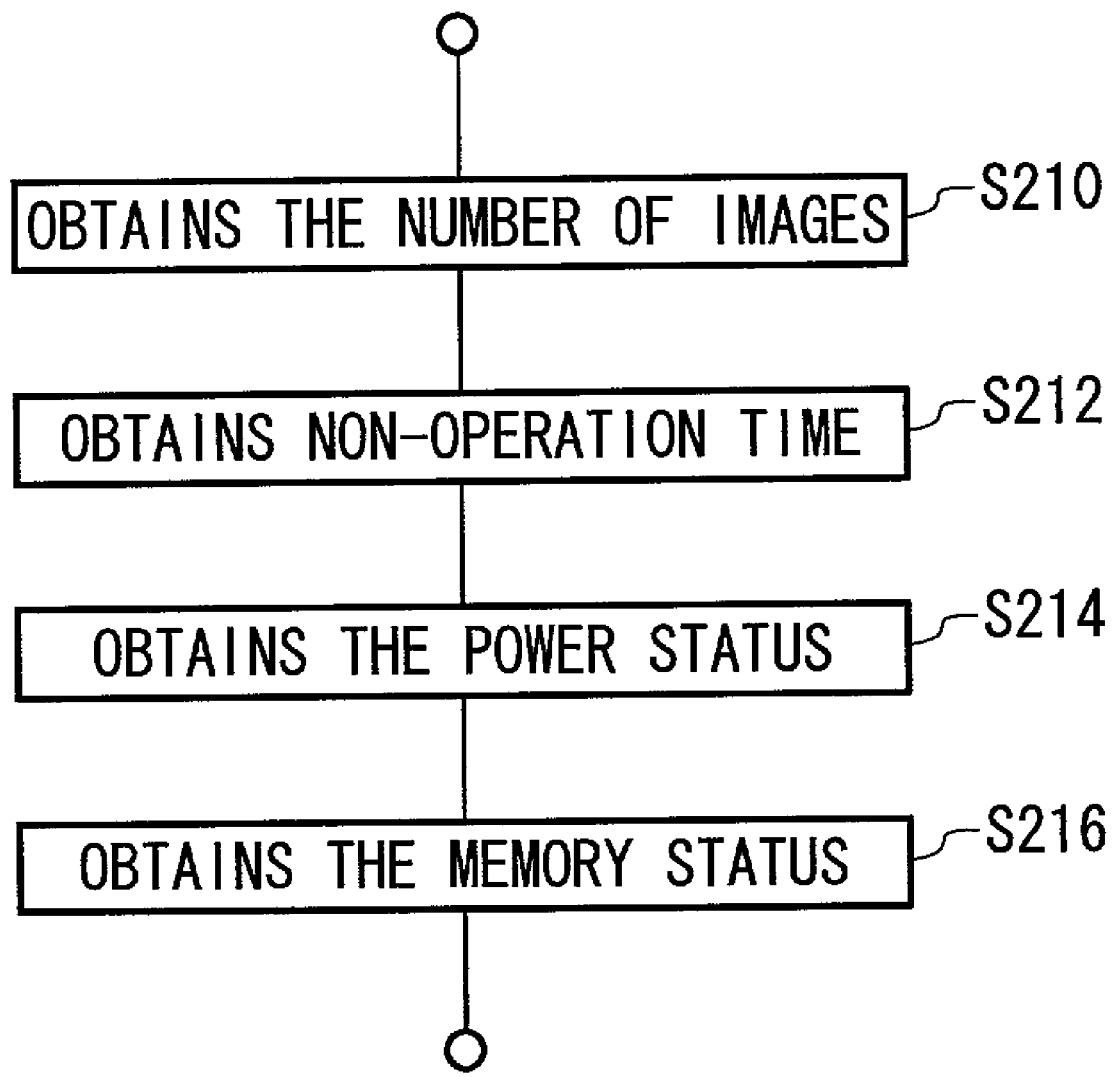
FIG. 11 is a flowchart showing the detailed process of obtaining information at S124 in FIG. 10.

FIG. 11 is a flowchart showing the detailed process of obtaining information at S124 in FIG. 10. First, the transmission allowance conditions-judging unit 170 obtains the number of photo images to be transmitted stored in a memory, by the number of images-obtaining section 166, at S210. Next, the transmission allowance conditions-judging unit 170 obtains from the image-capturing unit 20 a period of time not used for another operation since a photography operation, such as a shutter operation, is made, by the non-operation time-obtaining section 168, at S212. Then, the transmission allowance conditions-judging unit 170 obtains the power status of the digital camera with an automatic image transmission function 10, by the power status-obtaining section 172, at S214. Finally, the transmission allowance conditions-judging unit 170 obtains the data amount and the number of images stored in the main memory 68, by the memory status-obtaining section 174, at S216. The process of obtaining information according to the present embodiment ends with the process described above.

Figure 12:
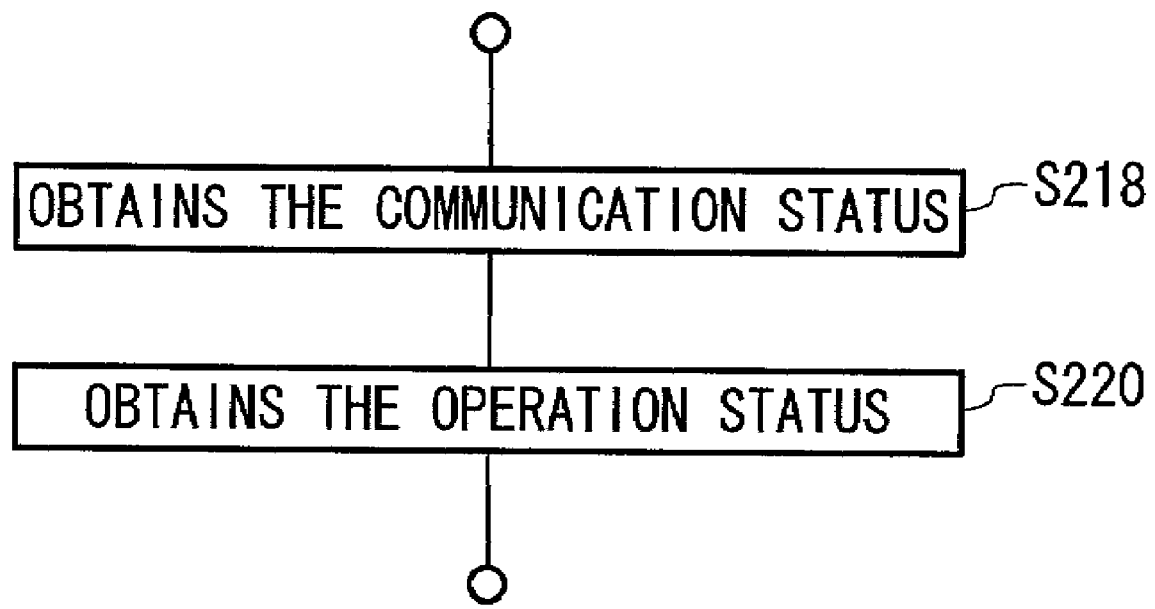
FIG. 12 is a flowchart showing the detailed process of obtaining information at S126 in FIG. 10.

FIG. 12 is a flowchart showing the detailed process of obtaining information at S126 in FIG. 10. The transmission control unit 150 obtains information relating to whether or not the cellular phone 12 can be communicated with, by the communication status-obtaining section 250, at S218. Then, the transmission control unit 150 obtains information relating to the operations made by the digital camera with an automatic image transmission function 10, such as a photography operation, by the operation status-obtaining section 260, at S220.

As described above, by automatically transmitting images photographed by the digital camera with an automatic image transmission function 10 based on a predetermined transmission condition or a predetermined transmission allowance condition, images may be transmitted faster in a preferable transmission allowance condition without interrupting the user's camera operation.

Finally a third embodiment of the present invention is described in the following.

Figure 7:
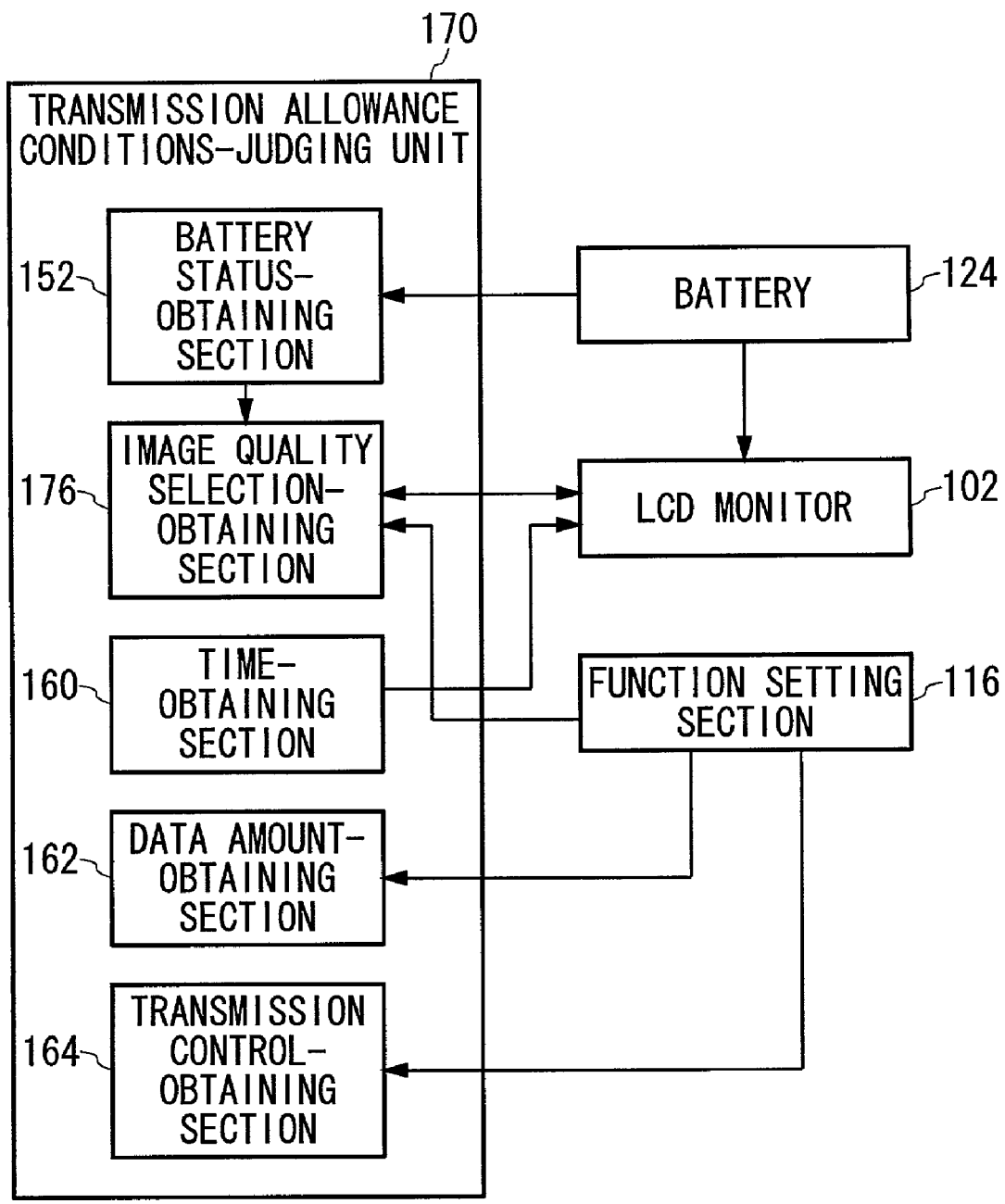
FIG. 7 is a functional diagram of a transmission allowance conditions-judging unit in the digital camera with an automatic image transmission function according to the third embodiment of the present invention.

FIG. 7 is a schematic representation of the transmission conditions-judging unit 170 according to the third embodiment. The transmission conditions-judging unit 170 according to the present embodiment differs from the transmission conditions-judging unit 170 according to the first embodiment in that the transmission conditions-judging unit 170 of the present embodiment includes an image quality selection-obtaining section 176. Since other functional elements are substantially the same as those in the first embodiment, description other than different functions is omitted here. When it is possible to transmit images by the difference in the image quality, based on the information of the remaining storage level of the battery 124 obtained from the battery 124 by the battery status-obtaining section 152, the image quality selection-obtaining section 176 notifies the user through the LCD monitor 102, prompts the user to select an image quality using the function-setting section 116, and accepts the selection.

Figure 13:
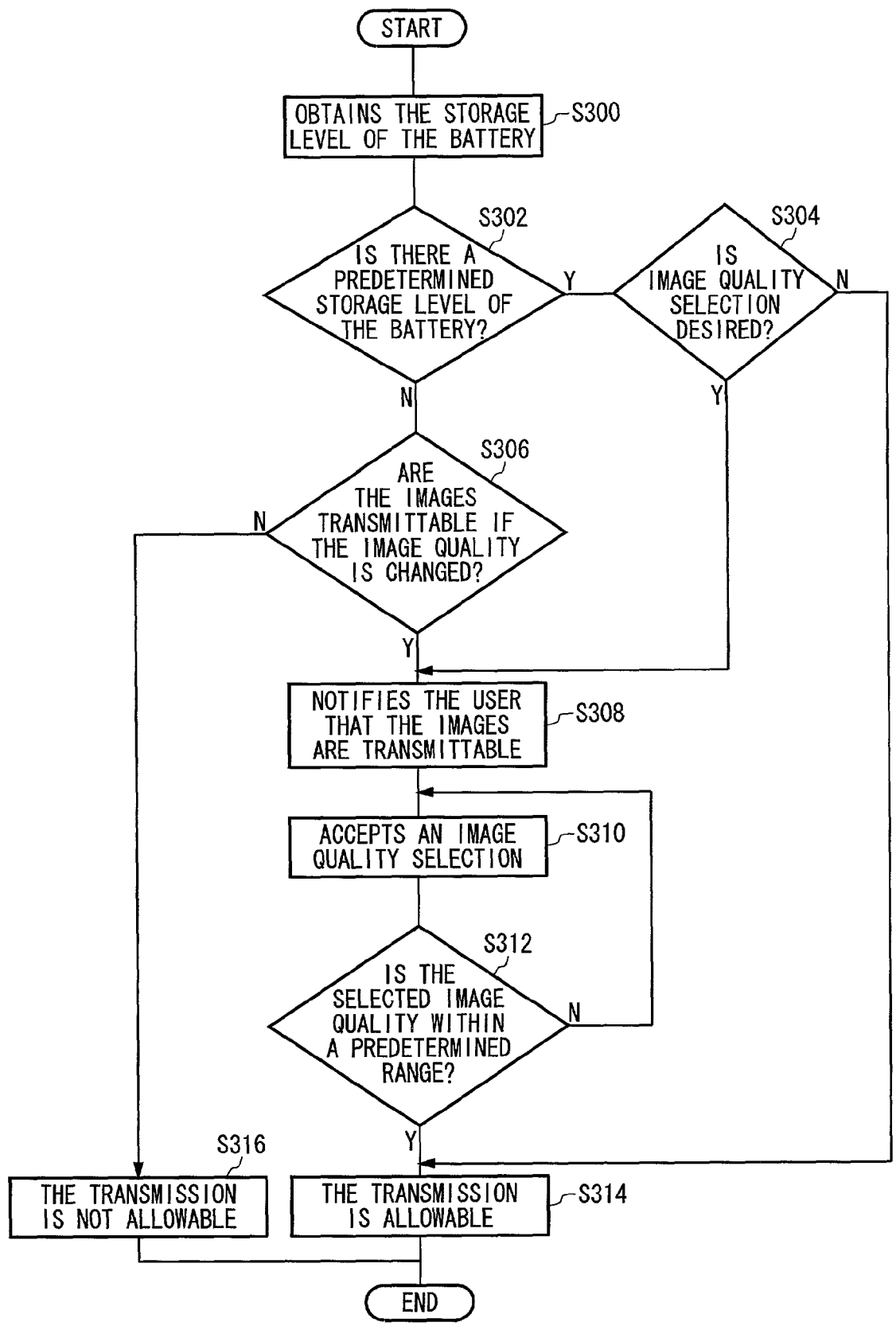
FIG. 13 is a flowchart showing the process of selecting an image quality undertaken by an image quality selection-accepting unit according to the third embodiment of the present invention.

FIG. 13 is a flowchart showing the process of selecting an image quality undertaken by an image quality selection-obtaining section 176 according to the present embodiment. First, the battery status-obtaining section 152 obtains the battery status of the battery 124, at S300. The transmission allowance conditions-judging unit 170 judges whether or not there is a predetermined storage level of the battery 124 necessary for transmitting images, at S302. If there is a predetermined storage level of the battery 124, "Y" at S302, the transmission allowance conditions-judging unit 170 judges whether or not images can be transmitted by changing their image quality, at S306. If there is not enough storage level of the battery 124 even if the image quality is changed, "N" at S306, the transmission is not allowed, at S316. If the images can be transmitted by changing the image quality, the image quality selection-obtaining section 176 notifies the user, through the LCD monitor 102, that the images can be transmitted by changing the image quality, at S308. Even if there is a predetermined storage level of the battery 124, "Y" at S302, the user may also choose whether or not to select an image quality, at S304. If the user does not select an image quality, "N" at S304, the transmission is allowed without changing the image quality, at S314.

At S308, when the user is notified that the images can be transmitted by changing the image quality, the image quality selection-obtaining section 176 accepts a selection of an image quality by using the function-setting section 116, at S310. Then, the transmission allowance conditions-judging unit 170 judges whether or not the selected image quality is within the predetermined range for transmitting images, through the image quality selection-obtaining section 176, at S312. If the transmission allowance conditions-judging unit 170 judges that the selected image quality is within the predetermined range, "Y" at S312, the transmission is allowed, at S314. If the transmission allowance conditions-judging unit 170 judges that the selected image quality is not within the predetermined range, "N" at S312, the image quality selection-obtaining section 176 notifies the user to reselect an image quality, through the LCD monitor 102. The transmission is not allowed until the selected image quality is within the predetermined range. Further, at S308, the image quality selection-obtaining section 176 may notify the user of a selection of only those image qualities that are capable of transmitting images, and at S310, may make the user previously select from only those image qualities that are capable of transmitting images.

Furthermore, the user may select the data amount of photo images to be transmitted, by using the function-setting section 116. Moreover, in order to instantly discern the remaining storage level of the battery 124, the display may be made on the LCD monitor 102. The remaining storage level of the battery 124 may be displayed on a display means, such as an LED, placed separately on the digital camera with an automatic image transmission function 10.

Moreover, when the data transmission rate differs according to the time range, the time-obtaining section 160 monitors cheaper time ranges. Then, the time-obtaining section 160 notifies the user through the LCD monitor 102 that the cheaper time range will end in a certain period of time. Thus, the user may find this information convenient when selecting a transmission allowance condition for setting and when manually transmitting images.

As is described above, according to the present invention, photo images photographed by a digital camera can be automatically transmitted in a preferable transmission condition.

Although the present invention has been described by way of exemplary embodiments, it should be understood that those skilled in the art might make many changes and substitutions without departing from the spirit and the scope of the present invention which is defined only by the appended claims.

What is claimed is:

1. A digital camera with an automatic image transmission function, comprising:
    a transmission section for transmitting photo images; and
    a transmission control unit connected to said transmission section, said transmission control unit judging whether a transmission allowance condition of completion of photography is satisfied, wherein
    if said transmission control unit judges that the completion of photography condition is satisfied, then said transmission control unit judges whether there is at least one transmission allowance condition other than the completion of photography to be checked, and
    if said transmission control unit judges that there is no transmission allowance condition other than the completion of photography, then said transmission section transmits said photo images,
    wherein
    a cost for a transmission is calculated based on unit communication time,
    a remaining time is an amount of time of a last unit communication time calculated as being not needed for transmission of the photo images, and
    said at least one transmission allowance condition other than the completion of photography includes the remaining time being at or below a predetermined remaining time level.

2. The digital camera as claimed in claim 1, wherein
    if said transmission control unit judges that there is at least one transmission allowance condition other than the completion of photography to be checked, then said transmission control unit judges whether the at least one transmission allowance condition other than the completion of photography is satisfied and said transmission section transmits said photo images if said transmission control unit judges that the at least one transmission allowance condition other than the completion of photography is satisfied.

3. The digital camera as claimed in claim 2, further comprising a battery, wherein,
    said transmission control unit includes a battery status-obtaining section connected to said battery,
    said battery status-obtaining section obtains a storage level of said battery, and
    said at least one transmission allowance condition other than the completion of photography includes the storage level of said battery being at or above a predetermined storage level.

4. The digital camera as claimed in claim 2, further comprising a timer, wherein
    said transmission control unit includes a time-obtaining section connected to said timer,
    said time-obtaining section obtains time, and
    said at least one transmission allowance condition other than the completion of photography includes said time being within a predetermined time range.

5. The digital camera as claimed in claim 4, wherein said transmission control unit notifies a user of a period of time to an end of said predetermined time range, based on said time obtained by said time-obtaining section.

6. The digital camera as claimed in claim 4, wherein said predetermined time range is based on a cost of transmission.

7. The digital camera as claimed in claim 1, further comprising a release switch, wherein
    said transmission control unit includes a transmission control-obtaining section connected to said release switch, and said transmission control-obtaining section obtains an instruction to control transmission of each of said photo images after photography.

8. The digital camera as claimed in claim 1, wherein said transmission control unit includes a transmission addressee registration section for registering a phone number of an addressee for transmitting said photo images.

9. The digital camera as claimed in claim 1, wherein said transmission section communicates wirelessly with a wireless communication device.

10. The digital camera as claimed in claim 9, wherein said wireless communication device is a cell phone.

11. A method for controlling a transmission, comprising:
    judging whether or not photography is completed;
    judging whether there is at least one transmission allowance condition other than a completion of photography to be checked when it is judged that the photography is completed; and
    transmitting photo images when it is judged that there is no transmission allowance condition other than the completion of photography,
    wherein a cost of transmission is based on a number of units of communication time required for transmitting, wherein a remaining time is an amount of time of a last unit of communication time calculated as being not needed for transmission, and wherein the at least one transmission allowance condition other than the completion of photography includes a remaining time condition wherein the remaining time is an amount of time of a last unit, said method further comprising:
    judging the remaining time condition as being satisfied if the remaining time is at or below a predetermined remaining time level.

12. The method as claimed in claim 11, further comprising:
    judging whether the at least one transmission allowance condition other than the completion of photography is satisfied when it is judged that there is the at least one transmission allowance conditions other than the completion of photography; and
    transmitting the photo images when it is judged that the at least one transmission allowance condition other than the completion of photography is satisfied.

13. The method as claimed in claim 12, wherein the at least one transmission allowance condition includes a battery storage level condition, said method further comprising:
    obtaining a storage level of a battery; and
    judging the battery storage level condition to be satisfied if the storage level of said battery is at or above a predetermined storage level.

14. The method as claimed in claim 12, wherein the at least one transmission allowance condition other than the completion of photography includes an acceptable time condition, said method further comprising:

obtaining time; and judging the acceptable time condition as being satisfied if said time is within a predetermined time range.

15. The method as claimed in claim 14, further comprising notifying a user of a period of time to an end of said predetermined time range, based on said obtained time.

16. The method as claimed in claim 14, wherein said predetermined time range is based on a cost of transmission.

17. The method as claimed in claim 11, further comprising:

obtaining an instruction to control transmitting for each of said photographed images, after photography.

18. The method as claimed in claim 11, further comprising:

registering a phone number of an addressee for transmitting said photo images.

19. The method as claimed in claim 11, further comprising:

transmitting the photo images to a wireless communication device.

20. The method as claimed in claim 19, wherein said wireless communication device is a cell phone.

21. The method as claimed in claim 11, wherein said judging is based on a plurality of conditions.

22. The method of claim 11, wherein the method is performed by a camera for transmitting the photo images.

23. A digital camera with an automatic image transmission function, comprising:

a transmission section for transmitting photo images;

a transmission control unit connected to said transmission section, said transmission control unit judging whether a transmission allowance condition of completion of photography is satisfied, wherein if said transmission control unit judges that the completion of photography condition is satisfied, then said transmission control unit judges whether there is at least one transmission allowance condition other than the completion of photography to be checked, and if said transmission control unit judges that there is no transmission allowance condition other than the completion of photography, then said transmission section transmits said photo images; and a memory that stores said photo images, wherein said transmission control unit includes a data amount-obtaining section connected to said memory, said data amount-obtaining section obtains a data amount of said photo images to be transmitted, and said at least one transmission allowance condition other than the completion of photography includes a cost for transmitting said photo images based on the data amount being within a predetermined cost range.

24. The digital camera as claimed in claim 23, wherein said data amount-obtaining section accepts a selection of said data amount by a user.

25. The digital camera as claimed in claim 23, further comprising:

a volatile memory connected to said data amount-obtaining section, said volatile memory providing said stored photo images to said transmission control unit and erasing said stored photo images after providing said photo images; and a non-volatile memory connected to said data amount-obtaining section, said non-volatile memory storing said photo images after said transmission section transmits said photo images.

26. The digital camera as claimed in claim 23, wherein when the cost for transmitting said photo images is above the predetermined cost range, said digital camera compresses the photo images so that the cost of transmitting the compressed photo images is within the predetermined cost range.

27. The digital camera as claimed in claim 23, wherein when the cost for transmitting said photo images is based on units of time, said digital camera is configured to transmit a subset of said photo images so that the cost of transmitting the subset of said photo images is optimized.

28. The digital camera as claimed in claim 27, wherein the cost of transmitting is based on a number of units of time, each unit of time being of a fixed duration, and the subset of said photo images is chosen to minimize a portion of a last unit of time not used for transmission.

29. A method for controlling a transmission, comprising:

judging whether or not photography is completed;

judging whether there is at least one transmission allowance condition other than a completion of photography to be checked when it is judged that the photography is completed; and transmitting photo images when it is judged that there is no transmission allowance condition other than the completion of photography, wherein the at least one transmission allowance condition other than the completion of photography includes a data amount condition, said method further comprising:

obtaining a data amount of said photo images to be transmitted; and judging said data amount condition as being satisfied if a cost for transmitting said photo images based on said data amount is within a predetermined cost range.

30. The method as claimed in claim 29, further comprising:

selecting a data amount by a user;

transmitting photo images corresponding to said data amount selected by the user.

31. The method as claimed in claim 29, further comprising:

determining whether to compress the photo images so that the cost of transmitting the compressed photo images is within the predetermined cost range when the cost for transmitting said photo images is above the predetermined cost range; and compressing the photo images based on the determination to compress the photo images.

32. The method as claimed in claim 29, further comprising transmitting a subset of said photo images so that the cost of transmitting the subset of said photo images is optimized when the cost for transmitting said photo images is based on units of time.

33. The method as claimed in claim 32, wherein the cost of transmitting is based on a number of units of time, each unit of time being of a fixed duration, and the subset of said photo images is chosen to minimize a portion of a last unit of time not used for transmission.

34. A digital camera with an automatic image transmission function, comprising:

a transmission section for transmitting photo images; and a transmission control unit connected to said transmission section, said transmission control unit judging whether a transmission allowance condition of completion of photography is satisfied, wherein if said transmission control unit judges that the completion of photography condition is satisfied, then said transmission control unit judges whether there is at least one transmission allowance condition other than the completion of photography to be checked, and if said transmission control unit judges that there is no transmission allowance condition other than the completion of photography, then said transmission section transmits said photo images, wherein said at least one transmission allowance condition other than the completion of photography includes a time duration required for transmitting said photo images being at or above a predetermined time duration level.

35. A method for controlling a transmission, comprising:

judging whether or not photography is completed;

judging whether there is at least one transmission allowance condition other than a completion of photography to be checked when it is judged that the photography is completed; and transmitting photo images when it is judged that there is no transmission allowance condition other than the completion of photography, wherein said at least one transmission allowance condition other than the completion of photography includes a time duration required for transmitting said photo images being at or above a predetermined time duration level.

* * * * *